United States Patent [19]

Johnson et al.

[11] Patent Number: 5,270,378
[45] Date of Patent: Dec. 14, 1993

[54] ACRYLIC SURFACTANTS AND COMPOSITIONS CONTAINING THOSE SURFACTANTS

[75] Inventors: David K. Johnson, Brooklyn Park; Patricia M. Savu, Ramsey, both of Minn.

[73] Assignee: Minnesota Mining and Manufacturing Company, St. Paul, Minn.

[21] Appl. No.: 966,458

[22] Filed: Oct. 26, 1992

[51] Int. Cl.$^5$ ............................................. C08L 27/00
[52] U.S. Cl. .................................. 524/520; 524/544; 524/507; 524/509; 524/514; 526/245; 428/421; 428/457; 428/483
[58] Field of Search ............... 524/520, 544, 507, 509, 524/514; 526/245; 428/421, 457, 483

[56] References Cited

U.S. PATENT DOCUMENTS 5,061,769 10/1991 Aharoni ............................... 526/245

Primary Examiner—Paul R. Michl
Assistant Examiner—LaVonda DeWitt
Attorney, Agent, or Firm—Gary L. Griswold; Walter N. Kirn; Mark A. Litman

[57] ABSTRACT

A novel fluorochemical polymer surfactant reduces disuniformities in polymeric coatings. The coating composition comprising an organic solvent, an organic polymer compatible with said solvent, and a coating aid comprising a fluorinated polymer different from said polymer compatible with said solvent, said fluorinated polymer having at least three different moieties within the polymer chain derived from reactive monomers, the monomers comprising a fluorochemical acrylate, a short-chain-alkyl acrylate, and a polar monomer.

10 Claims, No Drawings

ACRYLIC SURFACTANTS AND COMPOSITIONS CONTAINING THOSE SURFACTANTS

BACKGROUND OF THE INVENTION

1. Field of the Invention

The present invention relates to the use of fluorochemical surfactants in coating compositions to reduce disuniformities in the coatings. The surfactants reduce such effects as mottling without causing such side effects as fisheye and foaming in the coated materials. These surfactants are particularly useful in graphics systems such as positive-acting or negative-acting resist systems including printing plates and non-resist imageable polymerizable systems.

2. Background of the Art

There are many different types of coating operations that use organic polymeric resins in the coating solutions. The polymers are normally coated out of a solid solution and dried by the removal of most of the solvent. Many of the defects and problems that occur in the final product can be attributable to phenomena that occur in the coating and drying procedures. Amongst the problems that are known to occur during drying of polymeric film layers after coating are unevenness in the distribution of solid materials within the layer. Examples of specific types of problems encountered in coatings are "orange peel" and "mottling." The former is a fairly regular grainy surface that occurs on a dried coated film, usually because of the action of the solvent on the materials in the coating composition. Mottling often occurs because of an unevenness in the removal of the solvent from the coating composition. "Fisheyes" are another type of coating problem, usually resulting from a separation of components during drying. There are pockets of different ingredients within the drying solution, and these pockets dry out into uneven coating anomalies.

Surfactants have often been used to correct these types of problems, along with changes in the solvents of the coating compositions. Sometimes surfactants do not correct the salient problem, and in other cases, the surfactants create other problems even when they cure the first. It is sometimes necessary to investigate a large number of commercially available surfactants before finding one that is appropriate for a particular type of system, even if that commercial product is touted for use in correcting a particular type of defect.

U.S. Pat. Nos. 4,764,450 and 4,853,314 describe the use of particular changes in solvent systems to improve surface defects in positive-acting photoresist imaging systems.

U.S. Pat. No. 4,557,837 describes fluorochemicals useful in the preparation of foamable compositions such as those used in the cleanup of gas wells. The polymers described within that patent include some compounds useful in the practice of the present invention.

U.S. Pat. No. 3,950,298 describes thermoplastic fluorinated terpolymers that are useful, non-foaming additives to coating solutions for polymeric materials such as carpets and fibers. The coating compositions provide oleophobicity to the surfaces that are coated.

SUMMARY OF THE INVENTION

Fluorinated polymers formed by the polymerization of at least three monomers can provide a non-foaming or low foaming surfactant that is particularly useful in the application of polymerics layers. The surfactants can reduce surface anomalies such as mottling and fisheyes in certain solvent systems. The at least three monomers comprise a fluorinated ethylenically unsaturated monomer, a short chain-alkyl ethylenically unsaturated monomer, and a polar ethylenically unsaturated monomer.

DETAILED DESCRIPTION OF THE INVENTION

The present invention describes a coating composition comprising an organic solvent, an organic polymer compatible with said solvent, and a coating aid comprising a fluorinated polymer different from said polymer compatible with said solvent, said fluorinated polymer having at least three different moieties within the polymer chain derived from reactive monomers, the moieties comprising a fluorochemical acrylate, a short-chain-alkyl acrylate, and a polar monomer.

The present invention relates to polymeric surfactants which are particularly useful in the formation of polymer coatings, most particularly in the formation of imageable media where surface anomalies must be kept to a minimum. The fluorinated polymers contain at least three different units derived from at least three different copolymerizable monomers. The monomers would at least comprise a fluorinated ethylenically unsaturated monomer, a short-chain alkyl ethylenically unsaturated monomer, and a polar ethylenically unsaturated monomer. The polymers can be most conveniently formed by generating a polymeric backbone with the required pendant functionalities thereon. This can be done conveniently by selecting appropriate ethylenically unsaturated monomers with the desired pendant functionalities already present on the monomers so that they are also deposited on the polymer backbone. This is preferably done by forming an acrylate backbone by polymerization of at least three materials. Fluorochemical acrylate, short-chain alkyl acrylate, a polar monomer (e.g., acrylic acid). As previously noted, acrylates are not the only materials that will work, but they are preferred. The fluorochemical acrylate comprises an acrylate (including methacrylates) having a fluorocarbon group bonded to a hydrocarbon portion of the acrylate. The bonding of the group may be directly to the hydrocarbon group or bridging group on the acrylate, or it may be through an additional bridging group such as a sulfonamide group. These three monomers are free radically polymerized in the proportions desired for the final product. The polymerization is done in solvent, such as ethyl acetate or other convenient solvents. The short-chain alkyl acrylates have fewer than eighteen carbon atoms in the alkyl chain. Preferably the alkyl chain has fewer than sixteen carbon atoms, and more preferably less than twelve carbon atoms. The polar monomer for use in the present invention must have a polymerizable group compatible with acrylic polymerization, i.e., have ethylenic unsaturation as would be the case in an acidic styrene derivative. The preferred polar monomers are acidic monomers of acrylates (including methacrylates) and particularly those at least as polar and preferably more polar than hydroxyethylmethacrylate(HEMA). Although all molecular weights were found to reduce mottling, higher molecular weights could increase the foaming of the solutions. It was therefore found that molecular weights of less than 250,000 (weight average molecular weight) and more preferably less than 200,000 are desired. The most preferred materials had weight average molecular weights in the range of 15,000 to 120,000 (approximately 25,000 to 95,000).

Representative ethylenically unsaturated polar comonomers useful in such preparation include:
$CH_2=CHCOOCH_2CH_2OH$, $CH_2=CHP(O)(OH)_2$,
$CH_2=CHCOOH$, $CH_2=C(CH_3)COOH$,
$HOOC(=CH_2)CH_2COOH$, $CH_2=CHSO_3H$,
$CH_2=CHCH_2SO_3H$, $CH_2=CHCONHC(CH_3)_2CH_2SO_3H$,
and combinations thereof.

Representative fluoroaliphatic vinyl monomers useful in such preparations include:
$C_8F_{17}CH_2CH_2N(Ch_3)COCH=CH_2$,
  $C_8F_{17}CH_2CH_2OCOCH=CH_2$,
  $C_6F_{13}C_2H_4SCOCH=CH_2$,
  $C_8F_{17}SO_2N(C_2H_5)C_2H_4NHCOCH=CH_2$,
  $(CF_3)_cCF(CF_2)_8C_2H_2SCOC(CH_3)=CH_2$,
  $C_8F_{17}SO_2N(CH_3)C_2$    $H_4COOCH=CH_2$,
  $C_8F_{17}SO_2N(CH_3)CG_2C_6H_4CH=CH_2$,
  $C_6F_{13}CH_2CH_2OOCC(=CH_2)COOCH_2CH_2C_6F_{13}$,
  $C_7F_{15}CH_2OOCCH=CHCOOCH_2C_7F_{15}$,
  $C_6F_{13}C_2H_4N(CH_2CH_2OH)COCH=CH_2$,
  $C_7F_{15}CON(C_2H_5)C_3H_6SCOC(CH_3)=CH_2$,
  $C_6F_{13}CH_2NHCOCH=CH_2$,
  $C_8F_{17}CH_2CH_2OCH=CH_2$,
  $(CF_3)_2CF(CF_2)_6CH_2CH(OH)CH_2OCOCH=CH_2$,
  $(CH_3)_2CFOC_2F_4OCOCH=CH_2$,
  $C_8F_{17}C_2H_4SO_2N(C_3H_7)C_2H_4OCOCH=CH_2$,
  $C_7F_{15}C_2H_4CONHC_4H_8OCOCH=CH_2$,

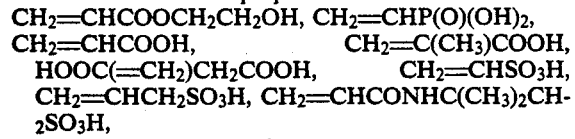

$C_7F_{15}COOCH_2C(CH_3)_2CH_2OCOC(CH_3)=CH_2$,
$C_8F_{17}SO_2N(C_2H_5)C_4H_8OCOCH=CH_2$,
$(C_cF_7)_2C_6H_3SO_2N(CH_3)C_2H_4OCOCH=CH_2$,

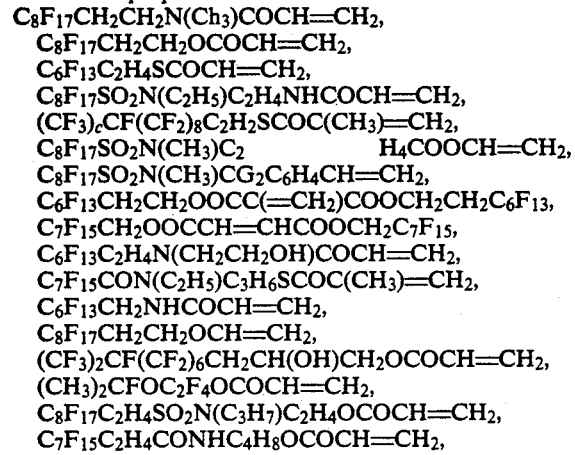

$C_8F_{17}CF=CHCH_2N(CH_3)C_2H_4OCOCH=CH_2$,
and combinations thereof.

The polymers useful in the present invention comprise any polymer soluble or dispersible in the organic solvent, particularly methyl ethyl ketone, 1-methoxy-2-propanol, and 30/70 mixtures of MEK and 1-methoxy-2-propanol. Examples of useful resins and polymers are polyvinyl acetals (e.g., polyvinyl butyral, polyvinyl formal), polyacrylates (e.g., from acrylates, methacrylates, acrylic acid, methacrylic acid, alkylacrylates, alkymethacrylates, etc.), polyurethanes, acrylated-urethanes, polyazlactones, polyvinyl resins (e.g., polyvinyl acetate, polyvinyl chloride, copolymers of vinyl resins, e.g., VAGH, VNYH, etc.), naphthogurnone-diazides, phenol-formaldehyde resins, polyamides, and mixtures thereof.

EXAMPLE 5

A random tertpolymer of Et-FOSEMA/BuMA/Acrylic Acid was prepared by dissolving 10 g Et-FOSEMA (FX-14, 3M), 6 g butyl methacrylate (Rohn & Haas), 4 g acrylic acid (Aldrich Chem, Milwaukee, WI), 0.8 g of Trigonox 21-C50 (50% t-butyl peroctoate, Witco Corp, a subsidiary of Akzo Corp) in 47 g of ethyl acetate. The polymerization solution was purged with nitrogen through a dip tube for two minutes and then sealed. The sealed bottles was shaken at 78° C. for eighteen hours. At the end of eighteen hours, the bottle was cooled down to room temperature and air was admitted. Polymer solution (2.1 g) was dried in a small aluminum pan at 90° C. for 1 hour. At the end of this time, 0.6 g of dry brittle solid was left (28.6% solids). When the polymer solution was diluted with 30/70 Dowanol ™ PM/MEK (Dowanol ™ PM, 1-methoxy-2-propanol solvent sold by Dow Chemical Co. and methyl ethyl ketone) to 0.05% surfactant. The surface tension was found to be 23.0 dynes/cm as measured by a Wilhemy plate. Yellow pigment was dissolved in the 0.05% FC surfactant solution at the 12% solids level. This solution was shaken twenty times and the time it took for the foam level to fall to zero was found to be 4 minutes 30 seconds. The solution (30/70 Solv PM/MEK) of yellow pigment (2% solids) with 0.05% of the FC polymer described above (based on solid polymer dissolved in ethyl acetate solution at 28.6% by weight) was coated on PET (polyethylene terephthalate) by pulling a hand spread on a wire wound rod (Meyer bar). The coated PET was dried under controlled air velocity and temperature conditions (in a forced air drying oven), then evaluated using a subjective comparison test with other similar formulations. Materials coated out showed approximately 75% less mottle than a control with no surfactant according to the present invention.

The table below shows the experiments listed as examples and their composition. Et-FOSEMA is an abbreviation for N-ethyl perfluorooctanesulfonamidoethyl methacrylate $[C_8F_{17}N(C_2H_5)CH_2CH_2OCOC(CH_3)=CH_2]$. FOMA is an abbreviation for 1,1-dihydroperfluorooctyl methacrylate $[C_7F_{15}CH_2OCOC(CH_3)=CH_2]$. Comparative Examples whose composition does not lie within the definition of the invention as described in the first section are listed below in Table 2. C-1, C-2, and C-3 use a higher alkyl methacrylate (eighteen carbons) instead of a lower alkyl one (one to ten carbons). C-3 uses a higher mole fraction of fluorochemical acrylate (0.80) in the polymer than as defined by this invention (less than 0.30). C-4 uses a lower mole fraction (X) of fluorochemical (x=0.085) than as defined by the preferred mode of this invention (x=greater than 0.089). Y is the mole fraction of the short-chain alkyl methacrylate and z is the mole fraction of the polar monomer. X+Y+Z is equal to N less than 1.0. C-5, C-3, and C-2 violate the preferred mode of this invention that X+Z should be less than 0.65 (see Table 3). It is preferred that X is above 0.085 and 0.30, Y should be between 0.10 and 0.615 or less, and Z should be between 0.30 and 0.60.

TABLE 1

| | Monomer Composition of Examples |
|---|---|
| Example | Weight % Et-FOSEMA ©/MA*/AA |
| 1 | 36/48 BuMA/16 |
| 2 | 29 FOMA/55 BuMA/18 |
| 3 | 28/60 LMA 12 |
| 4 | 40/35 BuMA/25 |
| 5 | 50/30 BuMA/20 |
| 6 | 47 FOMA/38 BuMA/14 |
| 7 | 55/35 BuMA/10 |
| 8 | 50/50 BuMA/0 |
| 9 | 50 FOMA/50 BuMA/0 |
| 10 | 55/35 BuMA/10 |
| 11 | 55/35 BuMA/10 |
| 12 | 55/35 BuMA/10 |

TABLE 1-continued

Monomer Composition of Examples

| Example | Weight % Et-FOSEMA ©/MA*/AA |
|---|---|
| 13 | 55/35 BuMA/10 |

TABLE 2

Monomer Composition of Comparative Experiments

| Example | Weight % Et-FOSEMA ©/MA*/AA |
|---|---|
| C-1 (Comp) | 50/50 ODMA/0 |
| C-2 (Comp) | 50/ODMA/20 |
| C-3 (Comp) | 80/12 ODMA/18 |
| C-4 (Inv) | 40/40 MMA/20 |
| C-5 (Inv.) | 60/20 MMA/20 |

Examples 1, 2, 3, 6, 7, 8, 9 were prepared in the following manner.

A random tertpolymer of Et-FOSEMA or FOMA-/alkyl methacrylate/Acrylic Acid was prepared by dissolving the appropriate amount of Et-FOSEMA or FOMA, alkyl methacrylate and acrylic acid, so that the total weight of monomers charged was 20 g, and 0.8 g of Trigonox 21-C50 (50% t-butyl proctoate, Witco Corp, a subsidiary of Akzo Corp) in 113 g of ethyl acetate. The polymerization solution was purged with nitrogen through a dip tube for two minutes and then sealed. The sealed bottles was shaken at 78° C. for eighteen hours. The bottle was then cooled down to room temperature and air was admitted.

EXAMPLES 4, 5, 12, C-2, C-3, C-5

These materials were prepared as outlined in Example 1 above so that the total weight of monomers charged in each case was 20 g.

EXAMPLE 11

A random terpolymer of Et-FOSEMA/BuMA/Acrylic Acid was prepared by dissolving 11 g of Et-FOSEMA, 7 g butyl methacrylate, 2 g acrylic acid, 0.1 g dodecyl mercaptan, and 0.8 g of Trigonox 21-C50 in 113 g of ethyl acetate. The polymerization solution was purged with nitrogen through a dip tube for two minutes and then sealed. The sealed bottles was shaken at 78° C. for eighteen hours. The bottle was then cooled down to room temperature and air was admitted.

EXAMPLE 2

A random terpolymer of Et-FOSEMA/BuMA/Acrylic Acid Was prepared by dissolving 304 g of Et-FOSEMA, 195 g butyl methacrylate, 56 g acrylic acid, 2.7 g dodecyl mercaptan, and 22 g of Trigonox TM 21-C50 (50% t-butyl peroctoate) in 1283 g of ethyl acetate. The polymerization solution was purged with nitrogen by allowing nitrogen to flow through the flask for 30 minutes while the monomers and solvent were charged. A slight positive nitrogen pressure was maintained on the flask during the reaction. The reaction mass was stirred at 75°-81° C. for 6.5 hours. At the time air was admitted to the flask and the solution was allowed to cool down to room temperature. The viscosity of the reaction mixture was measured and found to be 9.3 centistokes.

EXAMPLE 13

A random terpolymer of Et-FOSEMA/BuMA/Acrylic Acid was prepared by dissolving 36 g of Et-FOSEMA, 88 g butyl methacrylate, 25.2 g acrylic acid, and 9.9 g of Trigonox 21-C50 (50% t-butyl peroctoate) in 400 g of ethyl acetate. The polymerization solution was purged with nitrogen by allowing nitrogen to flow through the flask for 30 minutes while the monomers and solvent were charged. A slight positive nitrogen pressure was maintained on the flask during the reaction. The reaction was stirred at 75°-83° C. for 6.5 hours. At that time air was admitted to the flask and it was allowed to cool down to room temperature. The viscosity of the reaction mixture was measured and found to be 2.09 centistokes. The weight % unreacted monomers in the polymer as determined by gravimetric chromatography of standard solutions was found to be 0.35% Et-FOSEMa, 0.33% butyl methacrylate, 0.4% acrylic acid. H-nmr and C-nmr (Anal Req 37607) were consistent for the desired polymer.

TABLE 3

Foam Collapse Time

| Ex # | Wt % Et-FOSEMA ©/MA*/AA | Time for Foam Collapse (Minutes-m, Seconds-s) | x + z |
|---|---|---|---|
| C-2 | 50/50 ODMA/20 | >15 m | 0.80 |
| C-3 | 80/12 ODMA/18 | >15 m | 0.91 |
| C-5 | 60/20 MMA/20 | >15 m | 0.65 |
| 4 | 40/48 BuMA/16 | 4 m 30 s | 0.57 |
| 5 | 50/30 BuMA/20 | 4 m 30 s | 0.63 |
| 6 | 47 FOMA/38 BuMA/14 | 3 m | 0.52 |
| 9 | 50 FOMA/50 BuMA/0 | 3 m | 0.23 |
| 2 | 29 FOMA/55 BuMA/18 | 2 M 15 s | 0.45 |
| 1 | 36/48 BuMA/16 | 2 m | 0.48 |
| 3 | 28/60 LMA/12 | 1 m 45 s | 0.45 |
| 8 | 50/50 BuMA/0 | 1 m 45 s | 0.18 |
| C-4 | 40/40 MMA/20 | 1 m 24 s | 0.44 |
| 7 | 55/35 BuMA/10 | 1 m 15 s | 0.45 |
| no FC surfactant | | 1 m | |

As can be sen in Table 3, foam times of less than 5 minutes were obtained when the sum of the mole fractions of fluorochemical monomer plus acrylic acid were less than 0.65. Compositions where x+z were 0.65 or greater, all had foam times of 15 minutes or greater.

We claim:

1. A coating composition comprising an organic solvent, an organic polymer compatible with said solvent, and a coating aid comprising a fluorinated polymer different from said polymer compatible with said solvent, said fluorinated polymer having at least three different moieties within the polymer chain derived from reactive monomers, the monomers comprising a fluorinated acrylate, a short-chain-alkyl acrylate, and a polar monomer.

2. The coating composition of claim 1 wherein said fluorinated polymer has a molecular weight of less than 250,000.

3. The coating composition of claim 1 wherein said fluorinated polymer has a molecular weight between 5,000 and 120,000.

4. The coating composition of claim 1 wherein the fluorinated polymer is the acrylic reaction product of at least three polymers comprising at least one fluorinated acrylate, at least one short-chain-alkyl acrylate, and at least one polar monomer.

5. The coating composition of claim 4 wherein said fluorinated polymer has a molecular weight of less than 200,000.

6. The coating composition of claim 1 wherein the polymer compatible with said solvent is selected from the group consisting of polyvinyl acetals, polyacrylates, polyurethanes, acrylated-urethanes, polyozlactones, polyvinyl resins, phenol-formaldehyde resins, mophtroguinone-diazides, polyamides, and mixtures thereof.

7. A coated surface comprising a substrate with at least one surface having a coating thereon comprising an organic polymer and a fluorinated polymer, said fluorinated polymer comprising the acrylic reaction product of at least one fluorinated acrylate, a short-chain-alkyl acrylate, and a polar monomer.

8. The coated surface of claim 7 wherein said substrate comprises a polymeric film.

9. The coated surface of claim 7 wherein said substrate comprises polyethylene terephthalate.

10. The coated surface of claim 7 wherein said substrate comprises aluminum.

* * * * *

UNITED STATES PATENT AND TRADEMARK OFFICE
CERTIFICATE OF CORRECTION

PATENT NO. : 5,270,378
DATED : December 14, 1993
INVENTOR(S) : Johnson et al.

It is certified that error appears in the above-indentified patent and that said Letters Patent is hereby corrected as shown below:

Column 3, line 8, delete "HOOC" and
 insert --HOOCC--.

Column 3, line 14, delete "Ch$_3$" and
 insert --CH$_3$--.

Column 3, line 18, delete "(CF$_3$)$_c$ and
 insert --(CF$_3$)$_2$--.

Column 3, line 20, delete "CG$_2$" and
 insert --CH$_2$--.

Column 3, line 37, delete "(C$_c$F$_7$)" and
 insert --C$_3$F$_7$)--.

Column 4, line 18, delete "2%" and insert --12%--.

UNITED STATES PATENT AND TRADEMARK OFFICE
CERTIFICATE OF CORRECTION

PATENT NO. : 5,270,378
DATED : December 14, 1993
INVENTOR(S) : Johnson et al.

It is certified that error appears in the above-indentified patent and that said Letters Patent is hereby corrected as shown below:

Column 5, line 6, after Table 1 and before Table 2, insert the following:
--© ET-FOSEMA (Type I, except where listed as FOMA (Tertpolymer II)).
*MA-Methacrylate, ODMA=Octadecyl methacrylate, BuMA-Butyl Methacrylate, MMA-Methyl methacrylate, LMA-Laurel (C-10) methacrylate.--

Column 5, line 25, delete "proctoate" and insert --peroctoate--.

Column 5, line 49, delete "Example 2" and insert --Example 12--.

Column 5, line 51, delete "Was" and insert --was--.

Column 5, line 64, delete "9.3" and insert --19.3--.

UNITED STATES PATENT AND TRADEMARK OFFICE
CERTIFICATE OF CORRECTION

PATENT NO. : 5,270,378
DATED : December 14, 1993
INVENTOR(S) : Johnson et al.

It is certified that error appears in the above-indentified patent and that said Letters Patent is hereby corrected as shown below:

Column 5, line 68, delete "36g"
  and insert --136g--.
Column 6, line 3, delete "400g"
  and insert --1400g--.
Column 6, line 38, delete "sen"
  and insert --seen--.
Column 6, line 58, delete "5,000"
  and insert --15,000--.

Signed and Sealed this

Sixth Day of September, 1994

BRUCE LEHMAN

Attest:

Attesting Officer

Commissioner of Patents and Trademarks